(12) United States Patent
Omori et al.

(10) Patent No.: US 10,155,198 B2
(45) Date of Patent: Dec. 18, 2018

(54) ROUGH TERRAIN CRANE

(71) Applicant: TADANO LTD., Kawaga (JP)

(72) Inventors: Kazuya Omori, Kagawa (JP);
Fumitsugu Kusaka, Kagawa (JP);
Kenta Mitani, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 15/537,757

(22) PCT Filed: Aug. 17, 2015

(86) PCT No.: PCT/JP2015/073017
§ 371 (c)(1),
(2) Date: Jun. 19, 2017

(87) PCT Pub. No.: WO2016/098383
PCT Pub. Date: Jun. 23, 2016

(65) Prior Publication Data
US 2018/0036679 A1    Feb. 8, 2018

(30) Foreign Application Priority Data

Dec. 19, 2014    (JP) .................................. 2014-257064

(51) Int. Cl.
*B60K 13/04* (2006.01)
*B01D 53/94* (2006.01)
(Continued)

(52) U.S. Cl.
CPC ......... *B01D 53/9454* (2013.01); *B01D 53/94* (2013.01); *B60K 13/04* (2013.01);
(Continued)

(58) Field of Classification Search
CPC ...... F02D 41/029; F01N 9/002; F01N 3/0842; F01N 13/02; F01N 3/035; B60K 13/04
See application file for complete search history.

(56) References Cited

U.S. PATENT DOCUMENTS 3,144,138 A * 8/1964 Brown ...................... B60S 9/10
212/304
9,469,511 B2 * 10/2016 Terata ..................... B01D 53/94
(Continued)

FOREIGN PATENT DOCUMENTS

DE    102009058131 A1    6/2011
EP       2243651 A1   10/2010
(Continued)

OTHER PUBLICATIONS

International Preliminary Report on Patentability issued in PCT/JP2015/073017, dated Jun. 20, 2017.
(Continued)

*Primary Examiner* — James A Shriver, II
*Assistant Examiner* — James J Triggs
(74) *Attorney, Agent, or Firm* — Marshall, Gerstein & Borun LLP (57) ABSTRACT

A compact rough terrain crane in which an exhaust emission control device and an elevating step are laid out in a compact manner without impairing excellent small-radius turning performance is provided. The crane includes a lower carrier that has a front axle and a rear axle. The crane includes an exhaust emission control device that has a DOC which is connected to an exhaust pipe extending from a diesel engine and is supplied with exhaust, a DRT disposed downstream of the DOC, and an SCR disposed downstream of the DRT. The crane includes an elevating step. The DOC, the DRT, and the SCR are disposed in parallel on a virtual horizontal plane that is separated from an upper surface of the lower carrier by a predetermined distance. The step is disposed in a gap that is formed between the upper surface of the lower carrier and the exhaust emission control device.

4 Claims, 6 Drawing Sheets

(51) Int. Cl.
*B62D 21/18* (2006.01)
*B66C 15/00* (2006.01)
*B66C 23/42* (2006.01)
*F01N 3/28* (2006.01)
*B66C 23/40* (2006.01)

(52) U.S. Cl.
CPC .............. *B62D 21/18* (2013.01); *B66C 15/00* (2013.01); *B66C 23/40* (2013.01); *B66C 23/42* (2013.01); *F01N 3/28* (2013.01); *Y02A 50/2325* (2018.01)

(56) References Cited

U.S. PATENT DOCUMENTS

| | | | | |
|---|---|---|---|---|
| 2010/0000203 | A1* | 1/2010 | Kowada | B01D 46/0027 |
| | | | | 60/286 |
| 2010/0178216 | A1 | 7/2010 | Honda et al. | |
| 2012/0247861 | A1* | 10/2012 | Mizuno | B60K 13/04 |
| | | | | 180/296 |
| 2013/0213726 | A1* | 8/2013 | Okada | E02F 9/0866 |
| | | | | 180/309 |
| 2014/0102085 | A1* | 4/2014 | Mori | E02F 9/0866 |
| | | | | 60/301 |
| 2014/0299441 | A1* | 10/2014 | Chen | F16D 23/12 |
| | | | | 192/99 A |
| 2015/0001170 | A1* | 1/2015 | Terata | B01D 53/94 |
| | | | | 212/302 |
| 2016/0102593 | A1 | 4/2016 | Noguchi et al. | |

FOREIGN PATENT DOCUMENTS

| | | |
|---|---|---|
| JP | H02-78494 U | 6/1990 |
| JP | H04-35945 U | 3/1992 |
| JP | 2006027854 A | 2/2006 |
| JP | 2009-85065 A | 4/2009 |
| JP | 4286888 B2 | 7/2009 |
| JP | 2009-269553 A | 11/2009 |
| JP | 2012-149535 A | 8/2012 |
| JP | 2014-206053 A | 10/2014 |
| WO | WO-2014/188997 A1 | 11/2014 |

OTHER PUBLICATIONS

International Search Report issued in PCT/JP2015/073017 dated Nov. 24, 2015.
Supplementary European Search Report issued in European Patent Application No. 15869592 dated Aug. 13, 2018.

* cited by examiner

ROUGH TERRAIN CRANE

TECHNICAL FIELD

The present disclosure relates to a rough terrain crane equipped with an exhaust emission control device and an elevating step, particularly, to a layout of the exhaust emission control device and the elevating step on a vehicle body.

BACKGROUND

In general, a rough terrain crane includes a carrier device that is capable of four-wheel driving and four-wheel steering, and exhibits excellent small-radius turning performance and rough terrain traveling performance. The rough terrain crane includes a single driver seat or operating unit, has special performance that enables an operator on the driver seat to drive a vehicle and to perform operation of a crane mounted on the vehicle. The rough terrain crane is manufactured based on a compact design so as to exhibit such special performance. Therefore, an entire vehicle body is designed to be short, an engine (in general, a diesel engine) is disposed on a rear side of the vehicle body, and an elevating step or an exhaust emission control device, which will be described below, is disposed around a fender (for example, see Patent Document 1).

The exhaust emission of diesel engines contains particulate matter (hereinafter, referred to as "PM"), nitride oxide (hereinafter, referred to as "NOx"), or the like. The exhaust emission control device prevents the matter from being released into the air and prevents the air from being polluted. The exhaust emission control device includes, as the constituent elements, a diesel particulate filter (hereinafter, referred to as a "DPF") for collecting the PM, a diesel oxidation catalyst (hereinafter referred to as "DOC") for removing the NOx, a decomposition reactor tube (hereinafter referred to as "DRT"), and a selective catalytic reduction (hereinafter referred to as "SCR"). By combining the constituent elements, a desired exhaust emission control device is constituted (for example, see Patent Document 1).

However, in a large rough terrain crane, a front axle or a rear axle has a multi-axle structure, and a structure with a premise of attaching and detaching an outrigger and a boom to and from a vehicle-body frame is employed in some cases. The main reason for the front axle or the rear axle to have the multi-axis structure is to reduce the entirety of axle load to a certain load or lower. In addition, the reason for the structure with the premise of attaching and detaching the outrigger and the boom to and from the vehicle-body frame is employed is to be in accordance with the legislation of a country or a region where the large rough terrain crane is used. In other words, in some countries or regions, strict weight limit (axle load limit) is imposed on a vehicle traveling on a public road. Therefore, when the large rough terrain crane runs on a public road, the vehicle body, the outrigger, and the boom must be individually transported on a trailer in some cases.

In the large terrain crane employing the premise of attaching and detaching the outrigger or the boom, layout design of accessory machinery such as the exhaust emission control device and the elevating step has a low degree of freedom in utilizing a space around the fender. In other words, since the large rough terrain crane lifts a load having a heavy weight, a counterweight, or the like, in addition to the boom and the outrigger, has a large size; however, in a circumstance, a vehicle body (particularly, a vehicle width) is not allowed to increase in size so as to maintain a compact size as a characteristic of the rough terrain crane, and thus a space, in which the exhaust emission control device or the like is to be disposed, is reduced.

SUMMARY OF THE DISCLOSURE

The present disclosure is made under such background, and an object thereof is to provide a large rough terrain crane in which an outrigger or a boom is freely attached and detached, as a compact rough terrain crane including an exhaust emission control device and an elevating step which are laid out in a compact manner without impairing excellent small-radius turning performance.

(1) In order to achieve the object described above, a rough terrain crane includes: a lower carrier having a front axle and a rear axle; a boom device disposed above the lower carrier; and a single operating unit that performs driving and a boom operation via a hydraulic actuator. The lower carrier includes a lower frame, an outrigger provided to be freely attached and detached to an end portion of the lower frame, an engine that is disposed on an upper side of a rear end portion of the lower carrier, drives the axles, and supplies hydraulic pressure to the hydraulic actuator, and an elevating step. An exhaust emission control device is mounted to have a diesel oxidation catalyst which is connected to an exhaust pipe extending from the engine and is supplied with exhaust, a decompression reactor tube disposed downstream of the diesel oxidation catalyst, and a selective catalyst reduction disposed downstream of the decompression reactor tube. The diesel oxidation catalyst, the decompression reactor tube, and the selective catalyst reduction are disposed in parallel on a virtual horizontal plane separated from a top surface of the lower carrier by a predetermined distance, and the elevating step is disposed in a gap that is formed between the top surface of the lower carrier and the exhaust emission control device.

In the large rough terrain crane having a structure in which the outrigger is freely attached and detached, a counterweight that is provided on the boom device increases in size. Therefore, a space in which the exhaust emission control device and the elevating step are to be disposed, that is, a space between the top surface of the lower carrier and a lower surface of the counterweight of the lower carrier, is reduced. However, since the diesel oxidation catalyst, the decompression reactor tube, and the selective catalyst reduction are disposed in parallel on the virtual horizontal plane, the exhaust emission control device constituted thereof is reduced in size in a perpendicular direction, that is, a height direction of the lower carrier. Hence, the predetermined distance is easily secured in the layout design of the elevating step, and thus the elevating step can be disposed along with the exhaust emission control device on the top surface of the lower carrier in a compact manner.

(2) In the rough terrain crane, it is preferable that the decompression reactor tube be disposed in series with the diesel oxidation catalyst or the selective catalyst reduction in a longitudinal direction of the lower frame, and the diesel oxidation catalyst and the selective catalyst reduction be disposed in parallel to each other so as to face each other in a transverse direction of the lower frame.

In this configuration, the diesel oxidation catalyst and the selective catalyst reduction are disposed in parallel to each other; however, the decompression reactor tube is bonded to the diesel oxidation catalyst or the selective catalyst reduction in series in the longitudinal direction. Hence, a size in a vehicle-width direction which is required for mounting the exhaust emission control device is also reduced.

(3) In the rough terrain crane, it is preferable that the exhaust pipe be inclined at an angle of 30° or smaller with respect to the exhaust emission control device with a horizontal line as a reference.

In this configuration, the exhaust pipe is inclined, and thereby an occurrence of overhanging of the exhaust emission control device in the vehicle-width direction which is connected to the exhaust pipe is reduced. In other words, a size in the vehicle-width direction which is required for mounting the exhaust emission control device is much more reduced.

Since the exhaust emission control device and the elevating step are disposed in a compact manner in a stacked stated between the top surface of the lower carrier and the lower surface of the counterweight, the attaching and detaching function of the outrigger and the boom in a compact manner and the excellent small-radius turning performance are not impaired even in the large rough terrain crane.

DETAILED DESCRIPTION

Hereinafter, a preferred embodiment will be described with reference to appropriate figures. Note that the embodiment is only an example of a rough terrain crane, and it is needless to say that the embodiment may be modified in a range without departing from a gist of the present disclosure.

Figure 1:
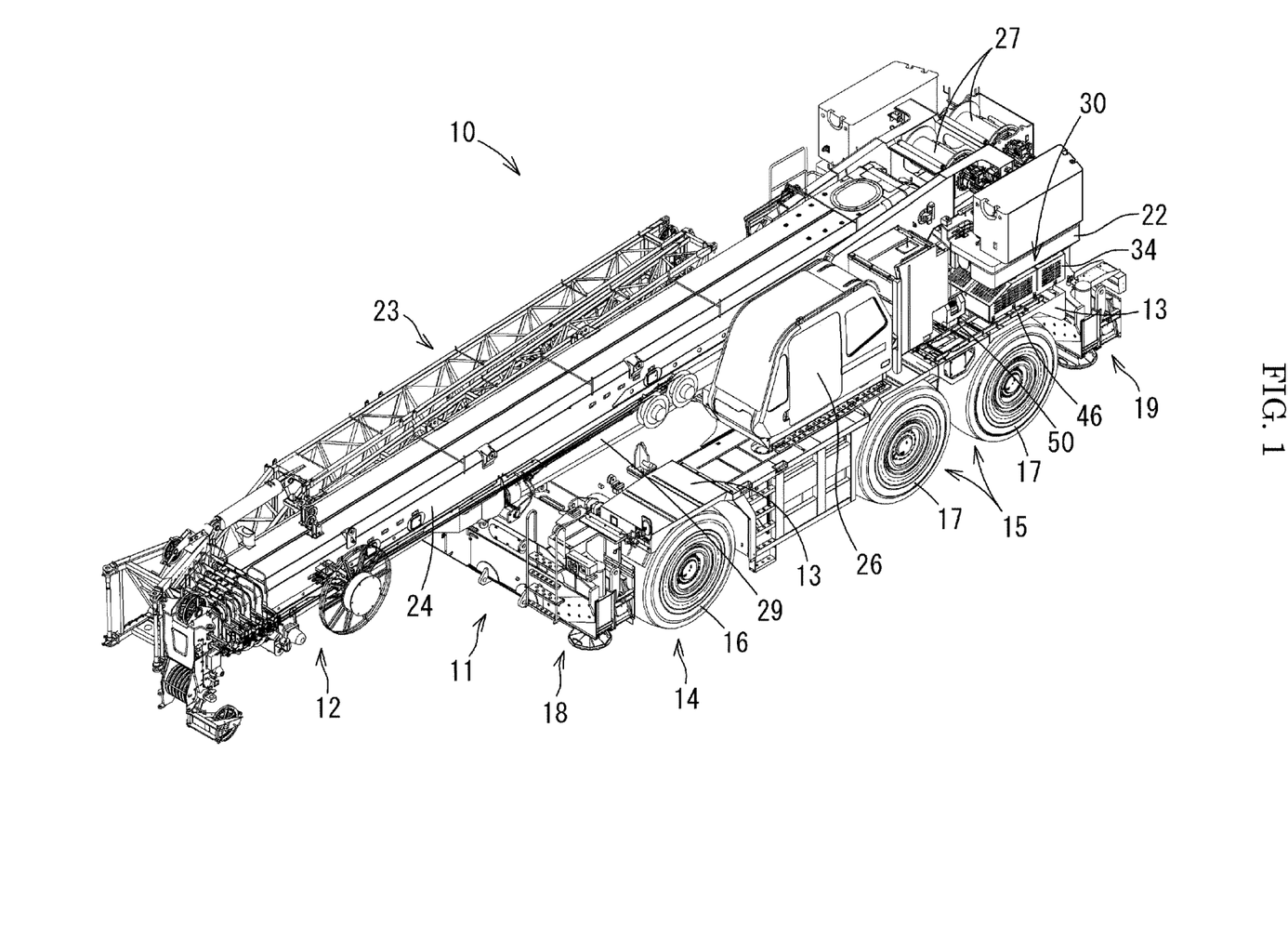
FIG. 1 is a perspective view of a rough terrain crane according to an embodiment.

FIG. 1 is a perspective view of a rough terrain crane 10 according to an embodiment.

The rough terrain crane 10 includes a lower carrier 11 and an upper working unit 12 disposed above the lower carrier 11.

The lower carrier 11 includes a lower frame 13, and a front axle 14 and a rear axle 15 are provided on the lower frame 13. A diesel engine 20 (refer to FIGS. 2 and 3) as a drive source of the front axle 14 and the rear axle 15 are mounted on an upper side of a rear end portion of the lower frame 13. Note that the diesel engine 20 includes an engine main body (not illustrated) and an engine cover 49 that covers the engine main body, and, in the embodiment, the diesel engine including the engine cover 49 is referred to as the diesel engine 20.

Wheels 16 and 17 of the front axle 14 and the rear axle 15 are driven by the diesel engine 20 via a transmission not illustrated and is steered by a hydraulic actuator not illustrated.

A front outrigger 18 and a rear outrigger 19 are mounted on a front end and a rear end of the lower frame 13, respectively, and overhang outward from the vehicle in order to maintain the stability of the vehicle during an operation of the upper working unit 12. The front outrigger 18 is connected to the front end of the lower frame 13 and is attachable to and detachable from the lower frame 13. The front outrigger 19 is connected to the rear end of the lower frame 13 and is attachable to and detachable from the lower frame 13. Note that the front outrigger 18, the rear outrigger 19, and the lower frame 13 are connected by a pin or other known means which is employed.

The hydraulic actuator, a hydraulic actuator 29 provided in the upper working unit 12, or a hydraulic pump (not illustrated) that supplies hydraulic pressure to the hydraulic actuator (not illustrated) provided in the upper working unit 12 is provided in the upper frame 13. The hydraulic pump is driven by the diesel engine 20.

The upper working unit 12 includes a slewing base 22 having the counterweight 28 (refer to FIG. 2) on the rear end so as to perform stable work of the upper working unit 12. The slewing base 22 is turnably mounted on the lower frame 13 through a slewing bearing (not illustrated). The boom device 23 is connected to the slewing base 22 via a boom-root fulcrum pin (not illustrated). The boom device 23 is supported to be undulated by the boom-root fulcrum pin. The boom device 23 undulates in response to expansion and contraction of the hydraulic actuator 29. An expansion boom 24 has an internally-installed hydraulic actuator (not illustrated), and operating of the hydraulic actuator causes the expansion boom to expand and contract. The boom device 23 has a winch 27 that is driven by a hydraulic motor (not illustrated), and operating of the winch 27 causes a work to move up and down.

The boom device 23 is attachable to and detachable from the upper working unit 12.

A single working unit 26 for driving the lower carrier 11 and operating the upper working unit 12 is supported on the lower carrier 11. For example, the driving of the lower carrier 11 means driving and steering of the wheels 16 and 17 for causing the rough terrain crane 10 to travel. The operating of the upper driving unit 12 means the undulation and expansion and contraction (boom operation) of the boom device 23 via the hydraulic actuator 29 and the internally hydraulic actuator installed in the expansion boom 24.

The rough terrain crane 10 according to the embodiment is characterized in that an exhaust emission control device 30 is mounted to be adjacent to the diesel engine 20 in layout which will be described below, and an elevating step 46, which will be described below, is disposed in a gap 47 formed between the top surface 56 of the lower carrier 11 and the exhaust emission control device 30.

Figure 2:
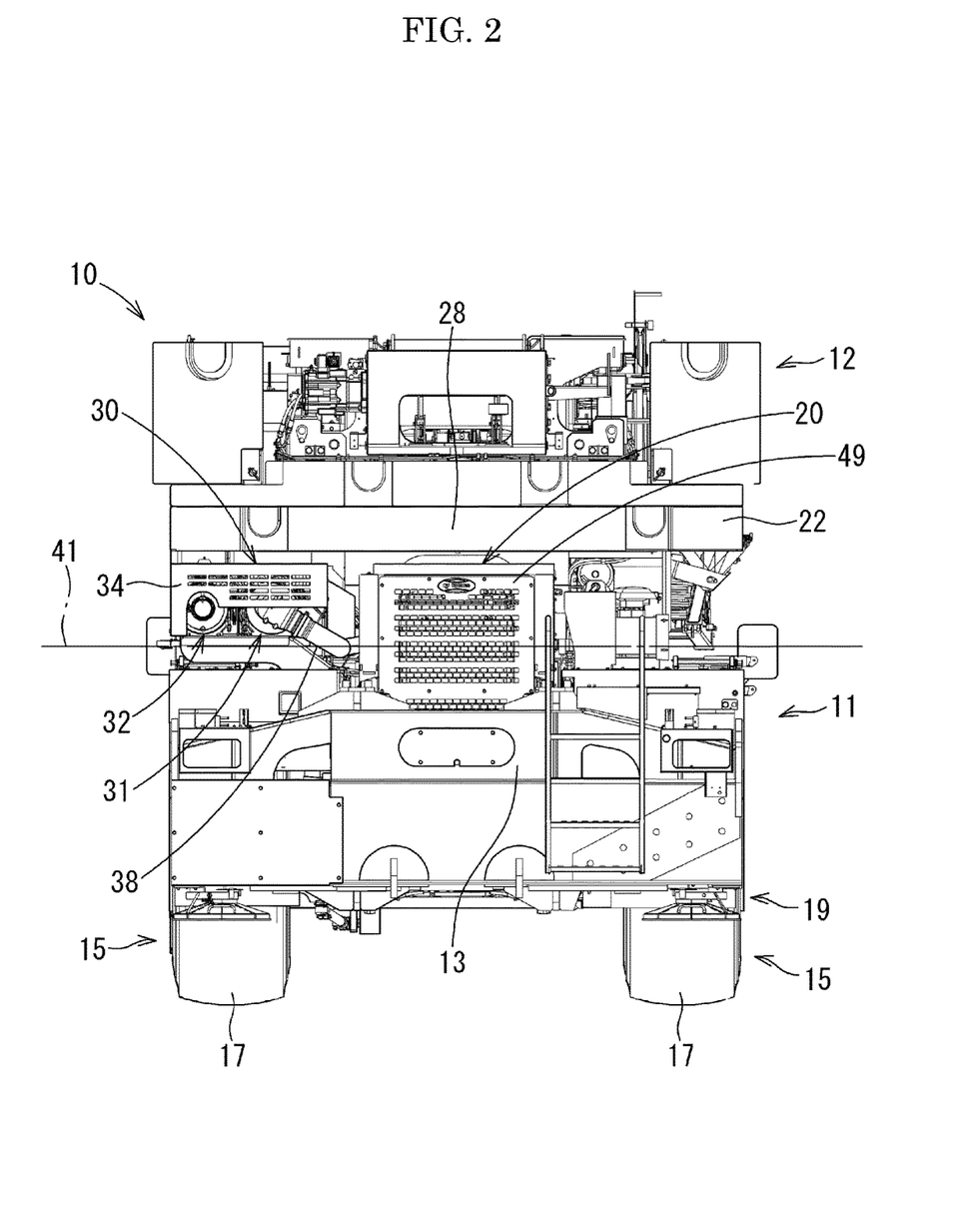
FIG. 2 is a rear view of the rough terrain crane according to the embodiment.

FIG. 2 is a rear view of the rough terrain crane 10 according to the embodiment. The exhaust emission control device 30 receives exhaust gas exhausted from the diesel engine 20 and control the same. The exhaust emission control device 30 is disposed on a left side when viewed from a vehicle rear side. The exhaust emission control device 30 is mounted to be adjacent to the diesel engine 20. In the embodiment, the exhaust emission control device 30 is provided with a cover 34. The cover 34 protects the exhaust emission control device 30 from being exposed to rain and dust.

Figure 3:
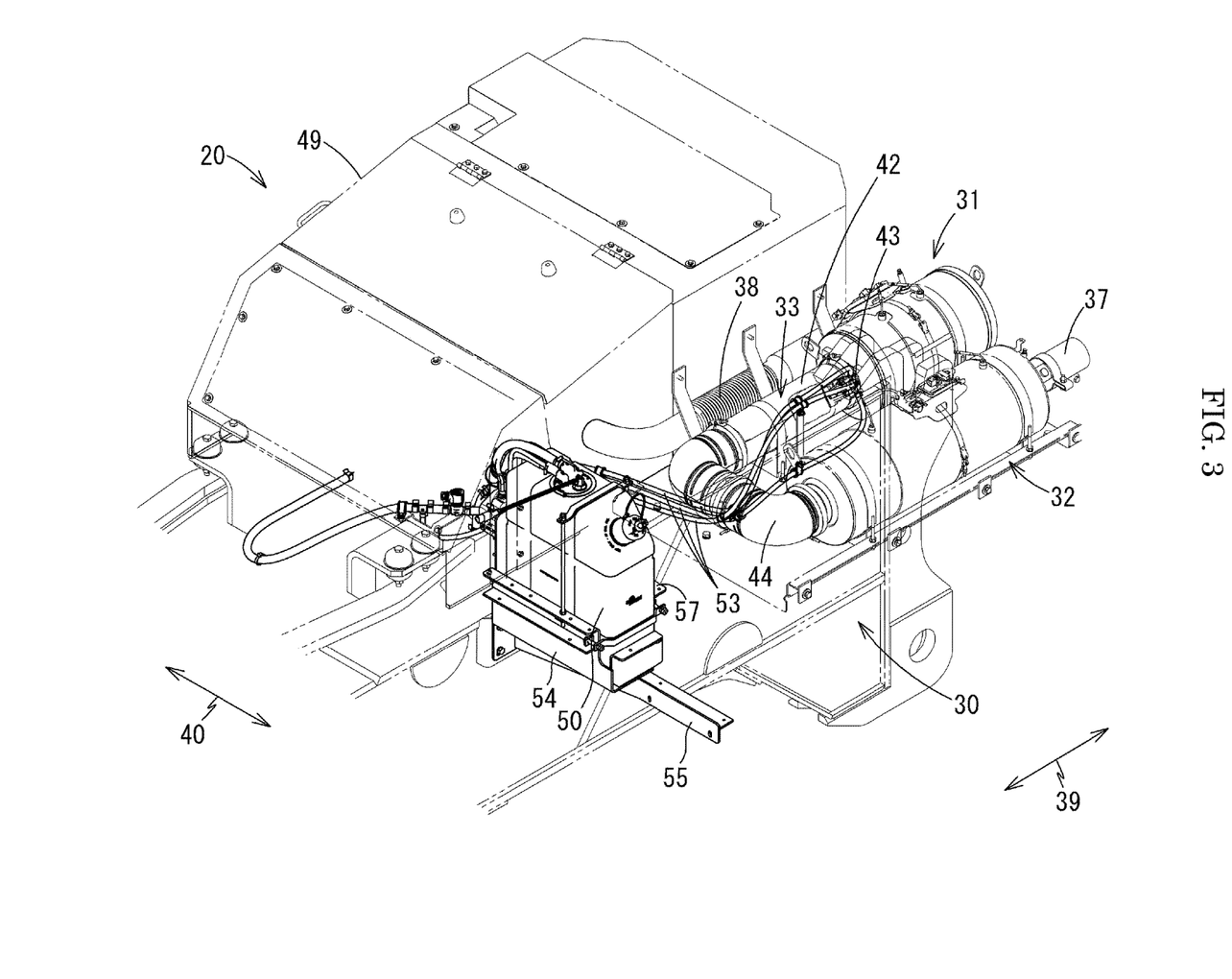
FIG. 3 is a perspective view illustrating an exhaust emission control device and the periphery of a diesel engine according to the embodiment.
Figure 4:
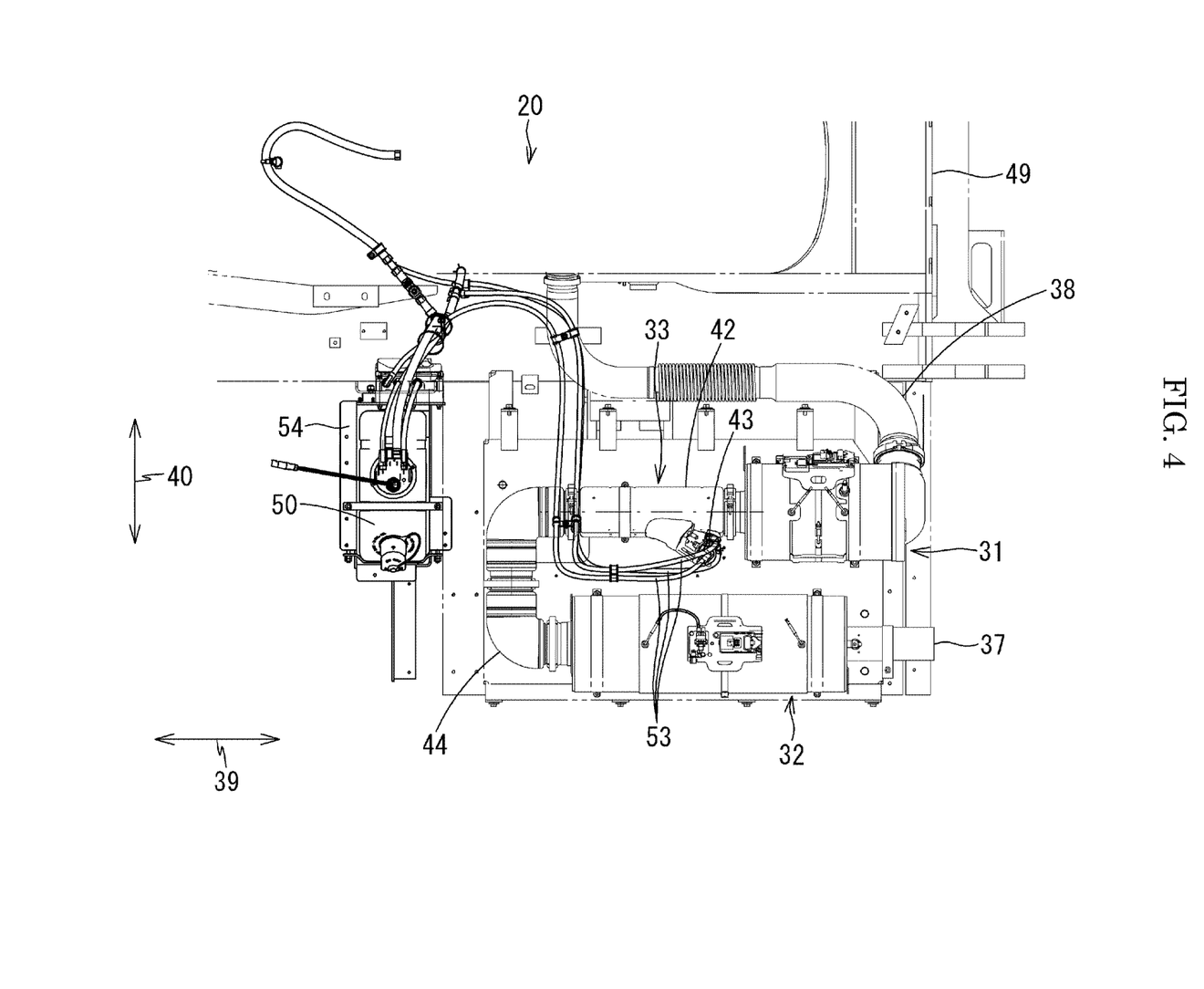
FIG. 4 is a plan view illustrating the exhaust emission control device and the periphery of the diesel engine in the lower carrier according to the embodiment.
Figure 5:
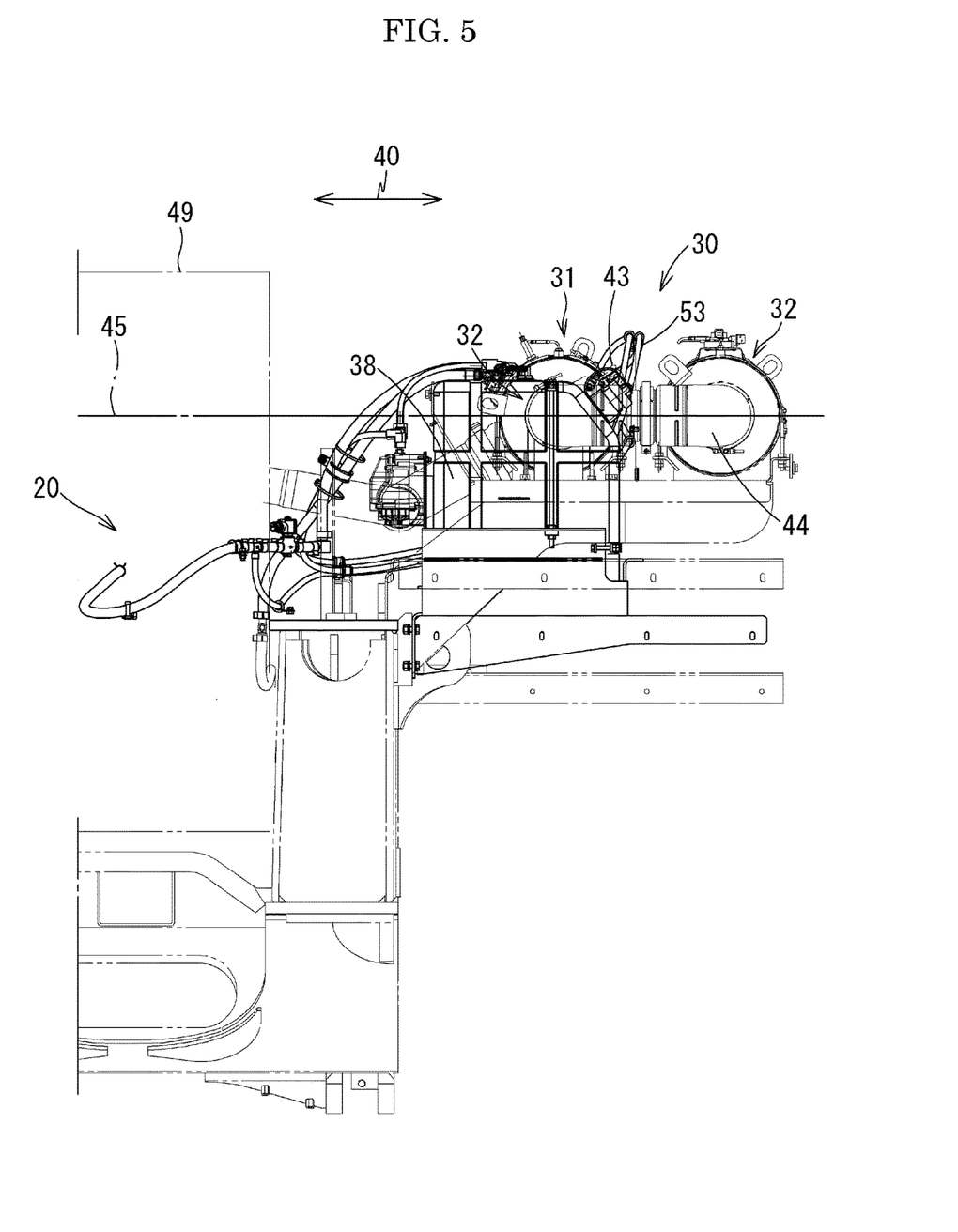
FIG. 5 is a side view illustrating the exhaust emission control device and the periphery of the diesel engine according to the embodiment.

FIG. 3 is a perspective view illustrating the exhaust emission control device 30 and the periphery of the diesel engine 20 in the lower carrier 11. FIG. 4 is a plan view illustrating the exhaust emission control device 30 and the periphery of the diesel engine 20 in the lower carrier 11. FIG. 5 is a side view illustrating the exhaust emission control device 30 and the periphery of the diesel engine 20 in the lower carrier 11. Note that the figures illustrate the layout of the exhaust emission control device 30 and the diesel engine 20, and the cover 34, the engine cover 49, or the like is omitted in the figures depending on views.

The exhaust emission control device 30 includes a diesel oxidation catalyst (hereinafter, referred to as "DOC") 31, a urea water tank 50 in which a predetermined reducing agent (urea water in the embodiment) is stored, selective catalyst reduction (hereinafter, referred to as "SCR") 32 that reduces nitrogen oxide in the exhaust emission through the urea water, and a decompression reactor tube (hereinafter, referred to as "DRT") 33 that supplies the urea water to the SCR 32.

The exhaust emission from the diesel engine 20 is first supplied to the DOC 31, passes the DRT 33 and the SCR 32 in this order, and is released as exhaust gas from a muffler 37 to the air. In other words, the DRT 33 is disposed downstream of the DOC 31, and the SCR 32 is disposed downstream of the DRT 33. Note that, in the embodiment, the muffler 37 a device (muffling device) reduces sound produced when the exhaust gas is released, and is a part of the SCR 32.

The DOC 31 is connected to the exhaust pipe 38 extending from the diesel engine 20.

As illustrated in FIG. 2, an end portion of the exhaust pipe 38 on the DOC 31 side is a position higher than an end portion of the exhaust pipe 38 on the diesel engine 20 side. In this manner, the exhaust pipe 38 is inclined with respect to the exhaust emission control device 30 with a horizontal line 41 as a reference. In the embodiment, the angle of inclination is 30°. Note that the angle of the inclination may be 30° or smaller.

The structure of the DOC 31 is already known. The DOC 31 mainly aims at treating of unburned fuel (HC and the like) and carbon monoxide (CO) contained in the exhaust emission and oxidizing nitrogen monoxide (NO) and nitrogen dioxide (NO2) contained in the exhaust emission. The DOC 31 oxidizes CO to carbon dioxide (CO2) burns HC as an increase in the exhaust gas temperature. As illustrated in FIGS. 3 and 4, in the embodiment, the DOC 31 has a casing and the outer shape of the casing is a cylindrical shape. The center axis line of the DOC 31 is in a frontward-rearward direction of the vehicle, i.e., a longitudinal direction 39 of the lower frame 13. The exhaust emission from the exhaust pipe 38 flows on the front side of the DOC 31 in the longitudinal direction 39.

The SCR 32 reacts with a reducing agent in the exhaust to reduce nitrogen oxide (NOX), and then finally converts the exhaust to a gas mixture of nitrogen (N2) and water (H2O) and emits the same to the atmosphere. In the embodiment, the DRT 33 supplies urea water for reducing the NOX in the exhaust emission. When the DRT 33 ejects the urea water into the exhaust emission, hydrolysis occurs to generate ammonium (NH3), and then the NOX is reduced by the NH3. Note that both the structure of the SCR 32 and the structure of the DRT 33 are already known.

In the embodiment, the DRT 33 includes a cylindrical pipe 42 and a supply valve 43 connected to the cylindrical pipe 42, and guides the urea water from the urea water tank 50. The supply valve 43 is connected to the urea water tank 50 via a pipe 53 and ejects the urea water into the cylindrical pipe 42 at a predetermined pressure. The DRT 33 is disposed in series with the DOC 31 in the longitudinal direction 39. In other words, the center axis line of the DRT 33 is in agreement with the center axis line of the DOC 31. The DRT 33 is disposed on the front side of the DOC 31 in the longitudinal direction 39 and extends in the forward direction. The exhaust emission passing through the DOC 31 flows in the longitudinal direction 39 to flow into the cylindrical pipe 42 of the DRT 33, and then receives the supply of the urea water from the supply valve 43.

The SCR 32 has a casing and the outer shape thereof is formed into a cylindrical shape. The center axis line of the SCR 32 is parallel to the longitudinal direction 39 of the rough terrain crane 10.

The SCR 32, the DOC 31, and the DRT 33 are disposed in parallel on a virtual horizontal plane 45 (refer to FIG. 5) that is widened in the longitudinal direction 39 and in a rightward-leftward direction of the vehicle, that is, a transverse direction 40 of the lower frame 13. The virtual horizontal plane 45 is positioned above the top surface 56 (refer to FIG. 6) of the lower carrier 11 by being separated from the top surface by a predetermined distance in a vertical direction. Note that the vertical direction is a direction in which the longitudinal direction 39 is orthogonal to the transverse direction 40.

In the embodiment, the SCR 32 is disposed in parallel to the DOC 31 to face each other in the transverse direction 40, and a coupling pipe 44 formed to cause both to form a substantial U shape is connected. The exhaust emission passing through the DRT 33 enters the coupling pipe 44, and then makes a U-turn to enter the SCR 32 disposed downstream of the DRT 33. In the SCR 32, the exhaust emission is controlled to be discharged as N2 and H2O as described above.

In general, the urea water tank 50 illustrated in FIG. 3 is made of a material such as resin or stainless steel having high corrosion resistance against the urea water and excellent weather resistance and impact resistance. There is no particular limitation on the shape of the urea water tank 50; however, in the embodiment, the tank is formed to have a substantially rectangular parallelepiped shape.

Figure 6:
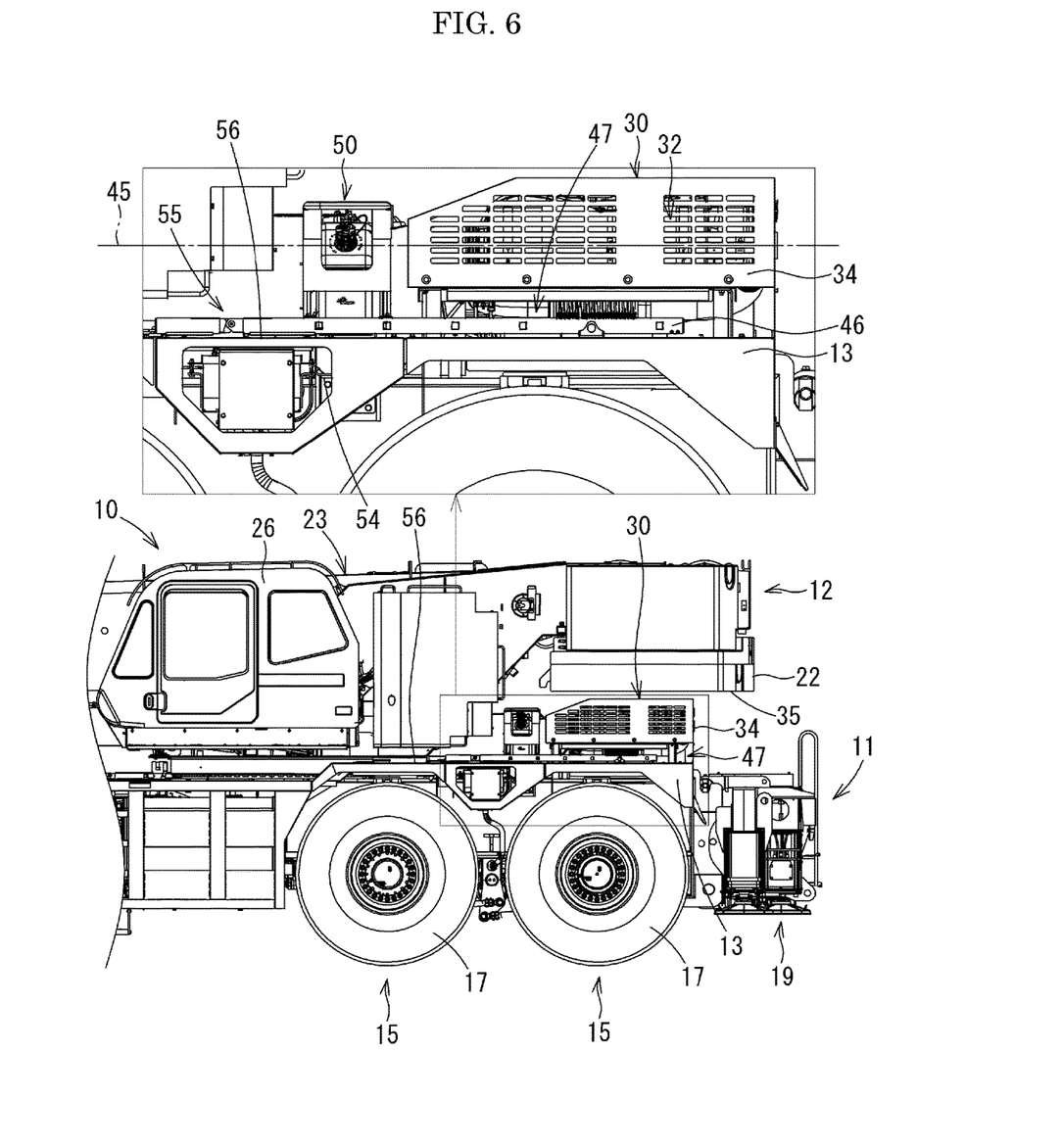
FIG. 6 is a side view of the rough terrain crane according to the embodiment and a view illustrating the periphery of an elevating step.

FIG. 6 is a side view of the rough terrain crane 10 according to the embodiment and a view illustrating the periphery of the elevating step 46. As illustrated in FIG. 6, the urea water tank 50 is disposed on the rear side from a front-side axle of the rear axle 15, and on the front side from the rear-side axle thereof. In addition, as illustrated in FIGS. 3 and 4, the urea water tank 50 is disposed on the front side of the DOC 31, the DRT 33, and the SCR 32. In addition, the urea water tank 50 is disposed in the vicinity of the left side of the diesel engine 20 when viewed from the rear side of the vehicle.

As illustrated in FIG. 3, the urea water tank 50 is supported by a support base 54 fixed to the lower frame 13.

As illustrated in FIGS. 1 and 6, in order to easily supply the urea water to the urea water tank 50 and to easily make an access to the boom-root fulcrum pin during disassembly of the boom, the rough terrain crane 10 includes the exhaust emission control device 30 including the urea water tank 50 and the elevating step 46 in the vicinity of the root fulcrum pin. The elevating step 46 is made of a metal material such as aluminum. The elevating step 46 is formed to have horizontal members as scaffolds that are fixed, at regular intervals, to two longitudinal members disposed at intervals. Note that the elevating step 46 may be configured to freely expand and contract.

The elevating step 46 is disposed on the top surface 56 of the lower carrier 11. In addition, at least a part of the elevating step 46 is disposed immediately below the exhaust emission control device 30. In other words, the elevating step 46 is disposed in the gap 47 that is formed between the upper surface 56 of the lower carrier 11 and the exhaust emission control device 30.

The structure of the elevating step 46 is already known, and is connected to the top surface 56 via a pivot axis. The elevating step 46 is capable of slewing around the pivot axis, and can overhang to the front side of the lower carrier 11. In addition, the elevating step 46 is bent in an intermediate portion 55, and thereby the elevating step is in an upright locking state to the lower carrier 11.

In the large rough terrain crane 10 having a structure in which the outriggers 18 and 19 are freely attached and detached, the counterweight 28 that is provided on the boom device 23 also increases in size. Therefore, a space in which the exhaust emission control device 30 and the elevating step 46 are to be disposed, that is, a space between the top surface 56 of the lower carrier 11 and the lower surface 35 (refer to FIG. 6) of the counterweight 28 is reduced. However, according to the embodiment, since the DOC 31, the DRT 33, and the SCR 32 are disposed in parallel on the virtual horizontal plane 45, the exhaust emission control device 30 constituted thereof is reduced in size in the perpendicular direction, that is, the height direction of the lower carrier 11. Hence, the distance between the virtual horizontal plane 45 and the top surface 56 of the lower carrier 11 is easily secured in layout design of the elevating step 46, and thus the elevating step 46 can be disposed along with the exhaust emission control device 30 on the top surface 56 of the lower carrier 11 in a compact manner.

In addition, in the embodiment, the DOC 31 and the SCR 32 are disposed in parallel to each other; however, since the DRT 33 is bonded to the DOC 31 in series in the longitudinal direction 39, a size in a vehicle-width direction which is required for mounting the exhaust emission control device 30 is also reduced.

In addition, in the embodiment, the exhaust pipe 38 is inclined, and thereby an occurrence of overhanging of the exhaust emission control device 30 in the vehicle-width direction which is connected to the exhaust pipe is reduced. In other words, a size in the vehicle-width direction which is required for mounting the exhaust emission control device 30 is much more reduced.

Modification Example

In the embodiment described above, the exhaust emission control device 30 is disposed at the position adjacent to the left side of the diesel engine 20 when viewed from the vehicle-rear direction as illustrated in FIG. 2; however, the position is not limited thereto. For example, the exhaust emission control device 30 may be disposed at a position adjacent to the right side of the diesel engine 20 when viewed from the vehicle-rear direction.

In the embodiment described above, the DRT 33 is disposed in series with the DOC 31 in the longitudinal direction 39; however, the DRT 33 may be disposed in series with the SCR 32 in the longitudinal direction 39. Specifically, the DRT 33 may be disposed downstream of the coupling pipe 44 and upstream of the SCR 32, and may be disposed in parallel to the DOC 31. The exhaust mission passing through the DOC 31 may flow to the DRT 33 through the coupling pipe 44.

In the embodiment described above, the DOC 31 and the SCR 32 are disposed in parallel to face each other in the transverse direction 40; however, the DOC and the SCR may not face each other in the transverse direction 40. For example, the DOC 31 and the SCR 32 may be disposed in parallel to face each other in the longitudinal direction 39.

The invention claimed is:

1. A rough terrain crane comprising:
   a lower carrier having a front axle and a rear axle;
   a boom device disposed above the lower carrier; and
   a single operating unit that performs driving and a boom operation via a hydraulic actuator,
   wherein the lower carrier includes a lower frame, an outrigger provided to be attached and detached to an end portion of the lower frame, and an engine that is disposed on an upper side of a rear end portion of the lower carrier, drives the axles, and supplies hydraulic pressure to the hydraulic actuator, and an elevating step,
   the rough terrain crane further comprising:
   an exhaust emission control device that has a diesel oxidation catalyst which is connected to an exhaust pipe extending from the engine and is supplied with exhaust, a decompression reactor tube disposed downstream of the diesel oxidation catalyst, and a selective catalyst reduction disposed downstream of the decompression reactor tube,
   wherein the diesel oxidation catalyst, the decompression reactor tube, and the selective catalyst reduction are disposed in parallel on a virtual horizontal plane separated from a top surface of the lower carrier by a predetermined distance, and
   wherein the elevating step is disposed in a gap that is formed between the top surface of the lower carrier and the exhaust emission control device.

2. The rough terrain crane according to claim 1, wherein the decompression reactor tube is disposed in series with the diesel oxidation catalyst or the selective catalyst reduction in a longitudinal direction of the lower frame, and the diesel oxidation catalyst and the selective catalyst reduction are disposed in parallel to each other so as to face each other in a transverse direction of the lower frame.

3. The rough terrain crane according to claim 1, wherein the exhaust pipe is inclined at an angle of between about thirty degrees and zero degrees with respect to the exhaust emission control device with a horizontal line as a reference.

4. The rough terrain crane according to claim 2, wherein the exhaust pipe is inclined at an angle of between about thirty degrees and zero degrees with respect to the exhaust emission control device with a horizontal line as a reference.

* * * * *

UNITED STATES PATENT AND TRADEMARK OFFICE
CERTIFICATE OF CORRECTION

PATENT NO. : 10,155,198 B2
APPLICATION NO. : 15/537757
DATED : December 18, 2018
INVENTOR(S) : Kazuya Omori et al.

Page 1 of 1

It is certified that error appears in the above-identified patent and that said Letters Patent is hereby corrected as shown below:

On the Title Page

At item (71), Line 1, "Kawaga (JP)" should be -- Kagawa (JP) --.

At item (57), Line 10, "crane includes" should be -- crane further includes --.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*